United States Patent
Ullrich

(10) Patent No.: US 9,357,052 B2
(45) Date of Patent: May 31, 2016

(54) DEVELOPING A NOTIFICATION FRAMEWORK FOR ELECTRONIC DEVICE EVENTS

(75) Inventor: Christopher J. Ullrich, Ventura, CA (US)

(73) Assignee: Immersion Corporation, San Jose, CA (US)

( * ) Notice: Subject to any disclaimer, the term of this patent is extended or adjusted under 35 U.S.C. 154(b) by 568 days.

(21) Appl. No.: 12/135,477

(22) Filed: Jun. 9, 2008

(65) Prior Publication Data

US 2009/0305744 A1 Dec. 10, 2009

(51) Int. Cl.
*H04M 19/04* (2006.01)
*H04M 1/725* (2006.01)

(52) U.S. Cl.
CPC .......... *H04M 1/72569* (2013.01); *H04M 19/04* (2013.01); *H04M 1/7253* (2013.01); *H04M 1/72566* (2013.01); *H04M 1/72572* (2013.01); *H04M 2203/2072* (2013.01); *H04M 2250/10* (2013.01); *H04M 2250/12* (2013.01)

(58) Field of Classification Search
CPC ..................................... H04M 19/04
USPC .................................. 715/745, 864
See application file for complete search history.

(56) References Cited

U.S. PATENT DOCUMENTS

| | | | |
|---|---|---|---|
| 6,466,232 B1 | 10/2002 | Newell et al. | |
| 6,747,675 B1 | 6/2004 | Abbott et al. | |
| 6,980,816 B2 | 12/2005 | Rohles et al. | |
| 7,003,525 B1 * | 2/2006 | Horvitz et al. | |
| 2003/0123634 A1 * | 7/2003 | Chee | 379/220.01 |
| 2004/0203673 A1 | 10/2004 | Seligmann | |
| 2006/0277474 A1 * | 12/2006 | Robarts et al. | 715/745 |
| 2007/0037605 A1 | 2/2007 | Logan | |
| 2007/0105533 A1 * | 5/2007 | Chiu | G06Q 10/109 455/412.2 |
| 2007/0127704 A1 * | 6/2007 | Marti et al. | 379/373.01 |

(Continued)

FOREIGN PATENT DOCUMENTS

| | | |
|---|---|---|
| CN | 1329450 A | 1/2002 |
| CN | 1633192 A | 6/2005 |

(Continued)

OTHER PUBLICATIONS

Dix et al., "Exploiting Space and Location as a Design Framework for Interactive Mobile Systems," ACM Transactions on Computer-Human Interaction, vol. 7, No. 3, Sep. 2000, pp. 285-321, http://citeseer.ist.psu.edu/dix00exploiting.html.

(Continued)

*Primary Examiner* — Justin Lee
(74) *Attorney, Agent, or Firm* — Miles & Stockbridge P.C.

(57) ABSTRACT

Systems and methods are described herein for developing a notification framework for presenting notification information to a user of an electronic device. One embodiment of a method, among others, includes receiving input from physical sensors located in proximity to an electronic device and receiving input from one or more other electronic devices in proximity to the electronic device. The method further comprises assessing a context of the electronic device from the received input. A notification framework is then determined from the assessed context. The method also includes notifying a user of the electronic device of a detected event associated with the electronic device. Notifying the user includes notifying the user within the notification framework.

17 Claims, 2 Drawing Sheets

(56) References Cited

U.S. PATENT DOCUMENTS

| | | | |
|---|---|---|---|
| 2008/0125102 A1 | 5/2008 | Abel et al. | |
| 2008/0146212 A1* | 6/2008 | Aaron | 455/419 |
| 2008/0153474 A1* | 6/2008 | Scott | 455/418 |
| 2008/0224883 A1* | 9/2008 | Mock | 340/825.36 |

FOREIGN PATENT DOCUMENTS

| | | |
|---|---|---|
| EP | 1 578 094 A2 | 9/2005 |
| JP | 2003134189 A | 5/2003 |
| JP | 2004364122 A | 12/2004 |
| JP | 2005094647 A | 4/2005 |
| JP | 2005110026 A | 4/2005 |
| JP | 2005210597 A | 8/2005 |
| JP | 2005278117 A | 10/2005 |
| JP | 2006229378 A | 8/2006 |
| JP | 2006270296 A | 10/2006 |
| JP | 2007043682 A | 2/2007 |
| JP | 2007174299 A | 7/2007 |
| JP | 2007325158 A | 12/2007 |

OTHER PUBLICATIONS

Fallman et al., "Meeting in Quiet: Choosing Suitable Notification Modalities for Mobile Phones," http://aiga.org/content.cfm/meeting-in-quiet-choosing-suitable-notification-modalities-for-m.

PCT/US2009/042067—International Search Report and Written Opinion.

* cited by examiner

DEVELOPING A NOTIFICATION FRAMEWORK FOR ELECTRONIC DEVICE EVENTS

TECHNICAL FIELD

The embodiments of the present disclosure generally relate to electronic devices and more particularly relate to developing a notification framework for determining how to alert a user of certain events associated with an electronic device.

BACKGROUND

Portable electronic devices, such as mobile phones, smartphones, camera phones, cameras, personal digital assistants ("PDAs"), etc., typically include output mechanisms to alert the user of certain events that occur with respect to the devices. For example, a cell phone normally includes a speaker for audibly notifying the user of an incoming telephone call event. The audible signal may include specific ringtones, musical ditties, sound effects, etc. In addition, cell phones may include display screens that can be used to visually notify the users of incoming phone calls. Furthermore, other sensory outputs can be presented to users via tactile actuators, vibration actuators, haptic feedback devices, etc.

Depending on a particular environment in which a user carries such a portable electronic device, some of the various types of notifications may be inappropriate. For this reason, conventional portable electronic devices are normally designed to allow the users to change notification settings as needed. For example, in a movie theater, a user can switch off the audible notification mechanisms in order to avoid noisy disruptions to others in the theater. Therefore, instead of an audible signal indicating an incoming phone call, a tactile sensation can be applied when the call is received. Although some developments have been made in the art of portable electronic devices to enable a user to manually set various notification mechanisms, further advancements and improvements in this regard can still be made.

SUMMARY

The present disclosure describes embodiments of systems, methods, and associated software for developing a notification framework of an electronic device. The notification framework defines how notification information is presented to a user of the electronic device. In one embodiment, among others, a method is described by receiving input from physical sensors located in proximity to the electronic device. The method also includes receiving input from one or more other electronic devices in proximity to the electronic device. From the received input, the method further comprises assessing a context of the electronic device and determining a notification framework from the assessed context. The method also includes notifying the user of the electronic device of a detected event associated with the electronic device within the notification framework.

Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components of the following figures are illustrated to emphasize the general principles of the present disclosure. Reference characters designating corresponding components are repeated as necessary throughout the figures for the sake of consistency and clarity.

DETAILED DESCRIPTION

Figure 1:
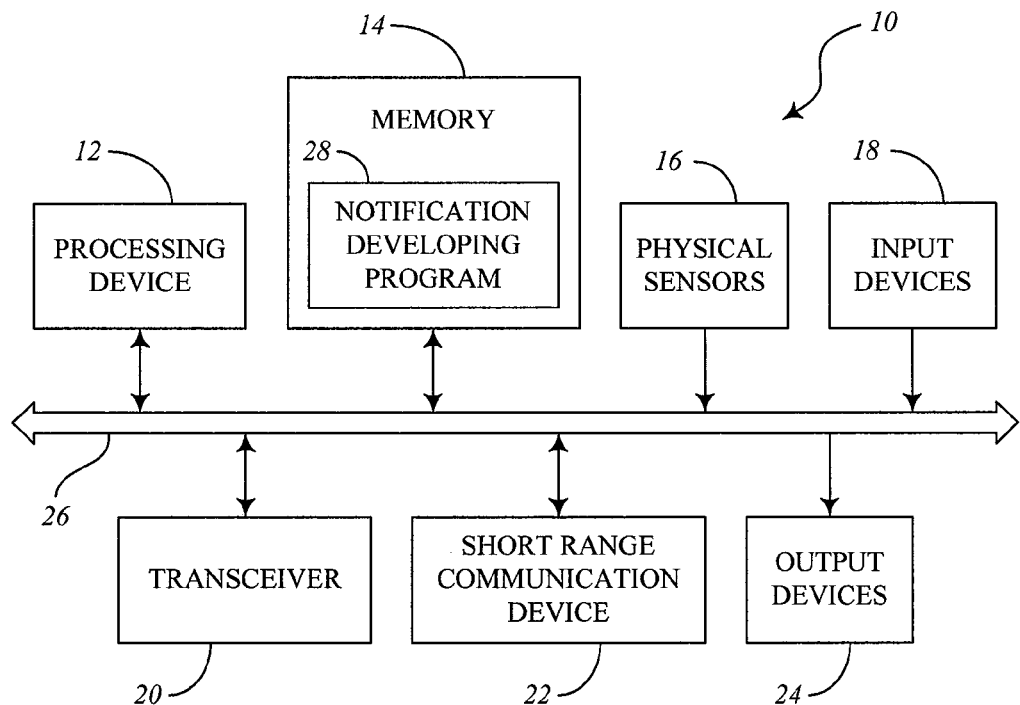
FIG. 1 is a block diagram illustrating a schematic of an electronic device according to one embodiment.

The embodiments of the present disclosure describe systems and methods for developing a notification framework for an electronic device, e.g., a portable electronic device. As described herein, a "notification framework" refers to a system of rules for how output signals are to be presented to a user of an electronic device. Output settings are established in order to present notifications to the user in an appropriate manner depending on the context or environment in which the electronic device currently exists. Therefore, when a specific event occurs, such as the receiving of a telephone call that would normally trigger an audible ringing output, the event is filtered through the notification framework to provide the appropriate type of output given the current context.

In particular, embodiments of the presently disclosed electronic devices include or are associated with sensors for sensing various types of input. The sensors repeatedly monitor various physical and virtual parameters or conditions to maintain updated data regarding the environment of the electronic device. The physical and virtual input information is processed in such a manner to assess the context in which the electronic device currently exists. From the context assessment, the notification framework can be established. Then, when an event occurs that would normally trigger one or more output mechanisms, the event is filtered through the notification framework for automatically providing the appropriate notification output via respective output devices for notifying the user of the event.

In this regard, automatically determining an appropriate notification strategy based on the context of the electronic device gives the user greater assurance that an output is adjusted depending on the particular environment. The electronic device with this capability can automatically provide a proper notification to avoid the presentation of disturbing audible signals in socially inappropriate settings, such as in a meeting, in a library, at a wedding or funeral, etc. In other contexts, such as in a vehicle or in a noisy environment, other settings can be established to increase the intensity of the outputs, such as by increased modulation.

Also, the electronic device may be configured to delay an output notification depending on the particular context, such as in an elevator, in the middle of a conversation with other people, when the user is using other program applications on the electronic device, etc. In a sense, the notification management system of the electronic device can operate in a capacity similar to a secretary who screens messages and prioritizes an accumulation of messages. When it is determined that a particular user context has been met, the notification management system presents the messages to the user for review or evaluation. In some scenarios, this notification can be presented completely or at least partially in a tactile fashion.

Such an electronic device can be easier for a user to manage, because the user would not need to manually set the outputs whenever the context of the electronic device changes. This frequent adjustment of output settings can be tedious to the user and can easily be forgotten, which can thereby lead to inappropriate situations, missed calls, or other negative consequences. Thus, by integrating the notification framework systems in an electronic device as described in the embodiments of the present disclosure, the notification framework can be automatically determined and repeatedly updated as the context of the electronic device changes.

Although many examples described in the present disclosure relate to cell phones or smartphones receiving incoming phone calls, it should be understood that the teachings of the present disclosure also encompass other types of electronic devices and other types of events associated with the electronic devices that can trigger an output notification. Other embodiments and applications will become apparent to one of ordinary skill in the art from an understanding of the present disclosure.

FIG. 1 is a block diagram of an embodiment of an electronic device 10, which is capable of providing one or more types of notifications to its user. Electronic device 10 may be capable of handling digital signals, analog signals, or both. Electronic device 10 may be configured as a portable electronic device, such as a wireless telephone, cellular phone, smartphone, camera phone, walkie-talkie, pager, camera, wristwatch, personal digital assistant ("PDA"), portable e-mail device, laptop computer, or other hand-held or portable device that provides notification signals to a user. In some embodiments, electronic device 10 may be a telephone, a desktop computer, or other device that provides notification signals to the user but may not be particularly portable.

In the embodiment illustrated in FIG. 1, electronic device 10 includes a processing device 12, memory 14, one or more physical sensors 16, input devices 18, a transceiver 20, a short range communication device 22, and output devices 24. Each of these components of electronic device 10 are interconnected via a bus interface 26. Memory 14 is configured to store, among other things, a notification developing program 28. Depending on the particular application of electronic device 10, some components as shown may not be needed and can therefore be omitted. For example, physical sensors 16, transceiver 20, and short range communication device 22 may be omitted depending on how electronic device 10 is implemented or designed.

Processing device 12 may be a general-purpose or specific-purpose processor or microcontroller for controlling the operations and functions of electronic device 10. In some embodiments, processing device 12 may include a plurality of processors for performing different functions within electronic device 10 as designed. Memory 14 may include one or more internally fixed storage units, removable storage units, and/or remotely accessible storage units. Memory 14 may include any combination of volatile memory, such as random access memory ("RAM"), dynamic RAM ("DRAM"), etc., and/or non-volatile memory, such as read only memory ("ROM"), electrically erasable programmable ROM ("EEPROM"), flash memory, etc. The storage units of memory 14 can be configured to store information, data, instructions, and/or software code.

Program code stored in memory 14 enables processing device 12 to execute logical procedures for developing a notification framework when a notification event occurs in electronic device 10. A "notification event" as described herein refers to any event that normally triggers a notification output to the user. For example, notification events may include events that trigger one or more of an audible signal, a visual signal, a tactile signal, and/or other types of output signals that can be sensed by the user. Examples of notifications include incoming short text messages (SMS), phone calls, environmentally sensed conditions (e.g. temperature, humidity, user's blood sugar, etc.), virtually sensed conditions (e.g. friend's chat availability, changes in a shared calendar, stock price changes, etc.).

Various logical instructions or commands may be included in notification developing program 28. Embodiments of notification developing program 28 of the present disclosure can be implemented in hardware, software, firmware, or a combination thereof. When implemented in software or firmware, notification developing program 28 can be stored in memory 14 and executed by processing device 12. When implemented in hardware, notification developing program 28 can be implemented in processing device 12 using discrete logic circuitry, an application specific integrated circuit ("ASIC"), a programmable gate array ("PGA"), a field programmable gate array ("FPGA"), etc., or any combination thereof.

Notification developing program 28 stored in memory 14, and any other software applications, programs, or computer code including executable logical instructions as described herein can be embodied in computer-readable media for execution by any suitable processing device. The computer-readable media can include one or more suitable physical media components that can store the software applications, programs, or computer code for a measurable length of time.

Physical sensors 16 and input devices 18 may include overlapping lists of components for receiving various types of input from the user or directly from the environment of electronic device 10. For instance, physical sensors 16 may include any suitable combination of microphones, cameras, accelerometers, surface contact sensors, global positioning system ("GPS") devices, thermometers, barometers, etc. In addition, physical sensors 16 may include any suitable combination of devices for measuring physiological information of the user, such as, for example, body temperature thermometers, blood pressure sensors, blood sugar sensors, etc. In some embodiments, physical sensors 16 are built into electronic device 10 or incorporate sensing device in use for the normal operation of electronic device 10. Depending on the particular design of electronic device 10, for example, physical sensors 16 in other embodiments can be attached to, in proximity to, or in communication with electronic device 10 as necessary.

Input devices 18 may include any suitable combination of buttons, switches, keyboards, keypads, cursor control devices, touch screens, stylus-receptive components, voice-activated mechanisms, microphones, cameras, infrared sensors, or other data entry devices. Output devices 24 may include any suitable combination of computer monitors, display screens, touch screen devices, speakers, buzzers, audio output devices, printers, tactile actuators, haptic effect devices, or other notification devices for providing output, e.g., notification events, to the user.

In some embodiments, some or all of physical sensors 16, input devices 18, and output devices 24 are not necessarily physically connected to electronic device 10. Instead, some of these devices can be in communication with electronic device 10 via near field communication ("NFC") or personal area network ("PAN") connection.

Transceiver 20 can be used for wireless communication between electronic device 10 and another device via any suitable wireless medium, channel, network, etc. As an example, transceiver 20 may be incorporated in a cellular phone, wireless phone, walkie-talkie, pager, e-mail device, etc., for enabling wireless communication. Short range communication device 22 may include any wired or wireless communication components to enable short range communication between electronic device 10 and another device. For instance, short range communication device 22 may be configured to conform to NFC or PAN standards, such as a Bluetooth™ compatible device.

In some embodiments, short range communication device 22 may detect the presence of other compatible devices in the vicinity of electronic device 10. Not only can short range communication device 22 detect the presence of these nearby devices, but it can also determine the current notification settings of these devices if these other devices are able to share their notification settings. Therefore, if it is determined that nearby devices are in a silent mode, indicating that a notification output on these respective devices will be visual or tactile, then this information of the current notification settings of these devices can be used to influence the notification framework of electronic device 10 itself.

Notification developing program 28 is capable of receiving input from one or more of the physical sensors 16, input devices 18, transceiver 20, and short range communication device 22. Notification developing program 28 can also receive input from "virtual sensors", which refer to logic modules configured to determine characteristics, settings, information, etc. from other software applications or programs running on electronic device 10. In some embodiments, virtual sensors may include sensors that receive information from a network, such as the Internet, which is in wired or wireless communication with electronic device 10. The network in this context may include any public or private networks available to electronic device 10. Information retrieved from the networks can be relayed by one or more servers in wired or wireless communication with electronic device 10.

The virtual input received from the virtual sensors can be used to deduce probable environmental conditions, such as a location of electronic device 10 if the user is scheduled to be in the location. The various inputs from the various components can be combined in such a way as to allow notification developing program 28 to assess the context or environment in which electronic device 10 currently exists. Once a reasonable assessment of the context is determined, notification developing program 28 is able to determine or establish a notification framework based on the context.

The notification framework generally defines how various output devices 24 of electronic device 10 are used to notify the user of specific events associated with electronic device 10. For example, if it is determined that the context of electronic device 10 is a location or situation where audible signals of output devices 24 might be inappropriate, then notification developing program 28 creates a framework that establishes more appropriate output notifications within the given context. Then, when a notification event occurs, notification developing program 28 is ready to provide the appropriate notification to the user within the determined notification framework by providing output signals to output devices 24 in any desirable combination according to the notification framework.

Figure 2:
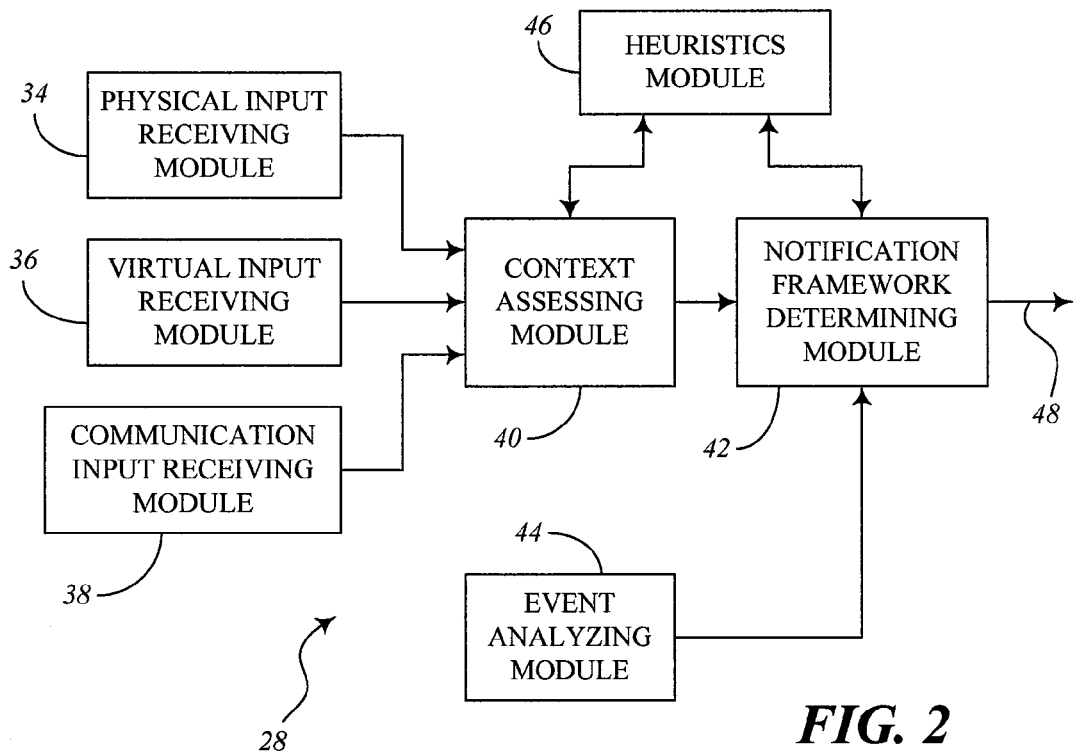
FIG. 2 is a block diagram illustrating logic modules of the notification developing program shown in FIG. 1 according to one embodiment.

FIG. 2 is a block diagram of an embodiment of notification developing program 28 shown in FIG. 1. According to this embodiment, notification developing program 28 includes a physical input receiving module 34, a virtual input receiving module 36, a communication input receiving module 38, a context assessing module 40, a notification framework determining module 42, an event analyzing module 44, and a heuristics module 46. In other embodiments, some of the modules shown in FIG. 2 can be combined together or omitted based on the particular design. For example, notification developing program 28 in some embodiments may include only one or two input receiving modules of the group of physical input receiving module 34, virtual input receiving module 36, and communication input receiving module 38. The input receiving modules receive input from any suitable combination of physical sensors 16, virtual sensors, transceiver 20, and/or short range communication device 22. Some embodiments may include additional modules for receiving additional input from other types of sensors if desired.

Execution of notification developing program 28 involves receiving input from various sources. Physical input receiving module 34 and virtual input receiving module 36 receive input from physical sensors 16 and/or virtual sensors. In some situations, input information may be supplied to the input receiving modules when operating in a passive mode. In other situations, the input receiving modules may actively seek out and extract the relevant information that can be used to determine the context of electronic device 10.

Physical input receiving module 34 is capable of receiving input from physical sensors 16 or other devices that provide information about the electronic device's physical properties or conditions, such as location or movement information from a GPS service, temperature, audibly sensed conversation, sound, noise, visually sensed images, etc. Furthermore, physical input receiving module 34 can also receive input regarding physiological information of the user of electronic device 10. Physiological information may include body temperature, blood pressure, blood sugar levels, etc.

Virtual input receiving module 36 is capable of receiving or deciphering information from other sources, such as other applications or software programs being executed in electronic device 10. For example, virtual input receiving module 36 may receive information from e-mail software, such as inbox information. Also, information such as news items and weather forecasts from newswires or the like can be received via a network, e.g., Internet, connection. Virtual input receiving module 36 may include, among other examples, Linked-In or Facebook notifications or updates.

In some embodiments, virtual input receiving module 36 can be associated with a calendar program running in electronic device 10. By analyzing information in the calendar program, virtual input receiving module 36 can be capable of determine an intended location of the user (e.g., in a meeting, at a doctor's office, etc.). From the calendar program, the nature of an appointment or scheduled activity may be included as input to virtual input receiving module 36 or may be implied in virtual input receiving module 36 itself by logical associations.

In addition to a calendar of the user's activities, another program may include calendar entries of other people associated with the user. For example, a contact list may include people associated with the user and the calendars of these people may be stored in memory 14 and analyzed by virtual input receiving module 36. In this respect, the calendar information of other people, who may be initiating a notification event to electronic device 10, can be supplied as input to virtual input receiving module 36.

Communication input receiving module 38 is another module capable of receiving input information about the conditions or operations of electronic device 10. Communication input receiving module 38 can receive information regarding the strength and/or bandwidth of cellular signals detected by transceiver 20. Communication input receiving module 38 can also receive information regarding the current notification settings used in nearby electronic devices as detected by short range communication device 22. Depending on the presence of these or other communication signals, communication input receiving module 38 can determine information that can also be used to reasonably assess the context of electronic device 10.

The input receiving modules are able to monitor operations, activities, and/or conditions that may be helpful to define the context in which electronic device 10 currently exists. Parameters related to the input thereof can be manipulated by the input receiving modules as necessary to gather explicit and/or implicit data that can be beneficial for assessing the context. This data is supplied to context assessing module 40, which stores and combines the various parameters, information, data, etc. Context assessing module 40 then automatically assesses the context of electronic device 10 and/or its user. The context may include social cues such as whether the user sitting or standing, whether the user is in a meeting, whether the user is currently talking with someone, etc.

Context assessing module 40 may give greater weight to certain factors while giving a lesser weight to others. Also, depending to the various combinations of different factors, other context results can be implied. In some embodiments, context assessing module 40 uses an algorithm for generally combining physical parameters such as user selections, ambient noise, live optical sensing, accelerometer information, etc., with virtual parameters, such as GPS information, environmental information, calendar reminders, available cell network bandwidth, etc. The assessment of the context is provided from context assessing module 40 to notification framework determining module 42.

The user's context is used to determine an appropriate notification framework for incoming messages, calls, reminders, etc. This framework may be as simple as allowing all incoming calls unless the user is in a meeting or as complex as a multi-level notification structure based on the caller's importance or relevance to the current user context (e.g., relevant business calls are notified more strongly during a business meeting than personal calls).

Notification framework determining module 42 uses the context assessment and determines a reasonable framework for how notification is to be presented to the user. The framework may be determined based on the different types of notification events that may be received with respect to the assessed context. Event analyzing module 44 receives or searches for events occurring within electronic device 10 that would normally trigger a notification alert for indicating the occurrence of the event to the user. When such an event is detected, event analyzing module 44 informs notification framework determining module 42 that an event has occurred and the type and nature of the event. When notification framework determining module 42 is informed of the event, the appropriate notification output to be presented to the user is provided along output 48, which leads to the various output devices 24 as needed.

Operation of context assessing module 40 and notification framework determining module 42 may involve multiple configured depending the particular situations. For example, if it is inferred that the user is in a meeting (using a calendar program, ambient audio, etc.) and electronic device 10 is not in close physical proximity to the user (e.g., on a belt clip, loose hip pocket, etc.), notification framework determining module 42 may be configured to use a very strong vibration alert for any event above a particular relevance threshold (e.g. message from business partner, call from Mom, etc.). In another example, if it is determined that electronic device 10 is in close physical proximity to the user (e.g. in the user's palm), notification framework determining module 42 may be configured to provide a high dynamic range vibration alert to allow the user to sense the nature of the incoming event. In a social context, for example, notification framework determining module 42 may determine that a short delay in an output to the user, until there is a pause in the conversation or when the user finishes a certain task at hand, before relaying a new incoming event to the user.

In some embodiments, communication input receiving module 38 may detect the proximity of other devices and the context in which these devices are operating. If most of the devices nearby are operating in a silent mode, notification framework determining module 42 may determine that it would be proper to switch to a silent mode as well by inferring that audio alerts may be inappropriate. On the other hand, if most nearby devices are set to maximum alert volume, notification framework determining module 42 may set electronic device 10 to a similar output.

Heuristics module 46 operates in conjunction with context assessing module 40 and notification framework determining module 42. Based on various contexts assessed and various notification frameworks established, heuristics module 46 can programmatically create links between combinations of context information and combinations of notification framework outputs. Heuristics module 46 can adjust the algorithms of context assessment module 40 and notification framework determining module 42 as necessary to better create appropriate notification frameworks based on both the context assessments and events.

In addition, the user may be allowed to enter data via input devices 18 to manually instruct heuristics module 46 how to perceive context assessment information with respect to notification frameworks. Therefore, contexts that might be incorrectly assessed because of unforeseen sensed input can be modified appropriately to customize electronic device 10 for its particular usage and the conditions of its user and typical environmental settings.

Optionally, heuristics module 46 may include a "learning mode" in which it monitors the behavior of the user. The user's response to various alerts can then be used to automatically adjust the connections between context assessing module 40 and notification framework determining module 42. An artificial neural network or similar artificial intelligence technology could be used to construct heuristics module 46.

Figure 3:
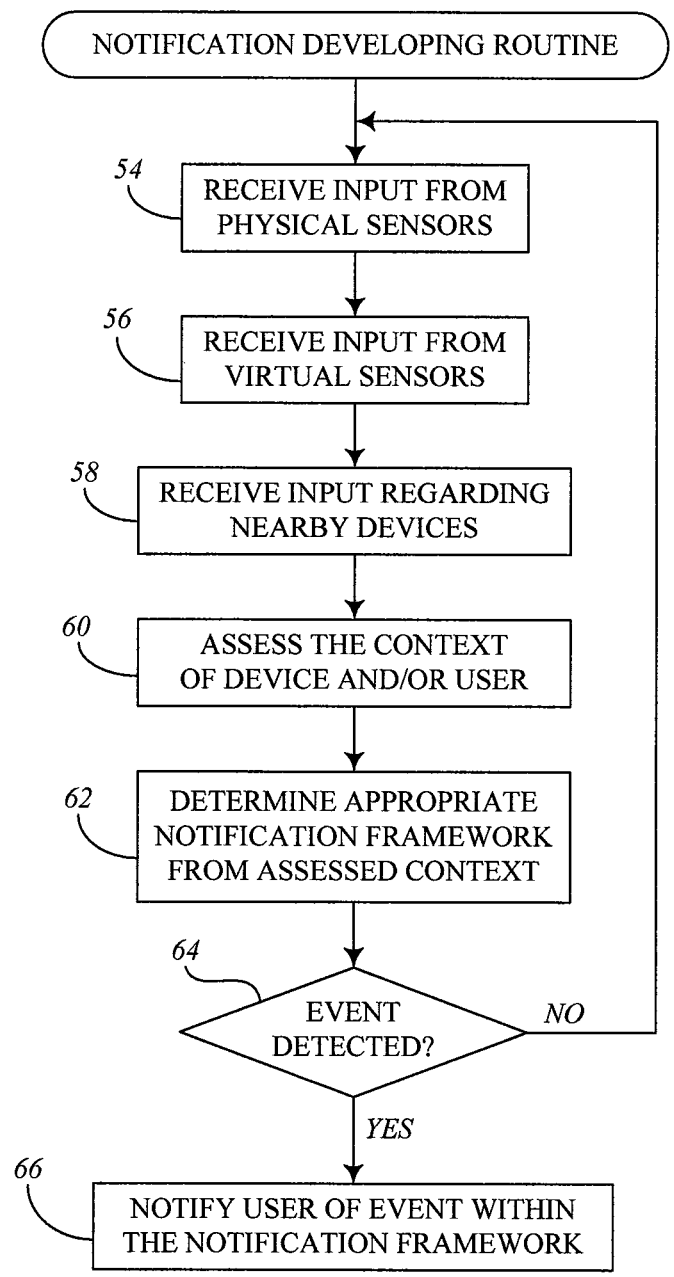
FIG. 3 is a flow diagram illustrating a method of a notification developing routine according to one embodiment.

FIG. 3 is a flow diagram illustrating an embodiment of a notification developing routine. The notification developing routine or other similar routine for developing or establishing an appropriate notification framework for presenting notifications of specific event in a user's electronic device can be associated with notification developing program 28 of FIG. 2 or other related program executed within an electronic device.

According to the embodiment of FIG. 3, the routine includes receiving input from one or more physical sensors, as indicated in block 54. Input is also received from virtual sensors, as indicated in block 56. Furthermore, other input is received regarding other devices nearby, as indicated in block 58. It should be noted that the received input mentioned in blocks 54, 56, and 58 can be received in any order, or two or more types of input can be received simultaneously. Therefore, the configuration of the order of blocks 54, 56, and 58 is not necessarily sequential as illustrated in FIG. 3. In addition, receiving input as indicated in these blocks can include recurrently receiving input and/or receiving of multiple inputs over time.

As indicated in block 60, the routine further includes assessing the context of the user's device and/or the user. In some embodiments, parameters of the user can be received as input from physical sensors (block 54) when the device or associated physical sensors are positioned in close proximity to the user. In other embodiments, parameters detected near or on the device can be at least partially representative of the context of the user, assuming that the user is in proximity with the device.

When the context is assessed, the appropriate notification framework is determined from the context assessment, as indicated in block 62. In decision block 64, it is determined whether or not an event that normally triggers a notification is detected. If not, the routine returns back to block 54 to repeatedly update the notification framework based on the latest context assessment. If it is determined in decision block 64 that an event is detected, then the routine proceeds to block 66, which indicates that the user is notified of the event in a manner within the notification framework established in block 62. The notification of the event includes presenting an output to the user within the appropriate framework. The presentation can be in the form of any suitable combination of audible, visual, tactile, and/or other sensory outputs.

It should be understood that the routines, steps, processes, or operations described herein may represent any module or code sequence that can be implemented in software or firmware. In this regard, these modules and code sequences can include commands or instructions for executing specific logical steps, processes, or operations within physical components. It should further be understood that one or more of the steps, processes, and/or operations described herein may be executed substantially simultaneously or in a different order than explicitly described, as would be understood by one of ordinary skill in the art.

The embodiments described herein represent a number of implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

I claim:

1. An electronic device comprising:
a processing device configured to develop a notification framework for defining how notifications are presented to a user of the electronic device when a specific event associated with the electronic device occurs;
one or more physical sensors configured to sense physical parameters;
a plurality of output devices each configured to present notification information to the user in one or more sensory modes, the sensory modes comprising at least one of audible, visual, or tactile;
wherein the processing device is further configured to assess the context of the electronic device by processing the sensed physical parameters and by processing information retrieved from one or more software programs either running on the electronic device or running on a network with which the electronic device communicates;
wherein the processing device is further configured to determine a notification framework from the assessed context;
wherein the processing device is further configured to determine whether the specific event associated with the electronic device occurs and to notify the user within the notification framework when the specific event occurs; and
a short range communication device configured to sense notification framework information from other nearby electronic devices, wherein the processing device is further configured to assess the context by analyzing the predominate notification settings of a plurality of nearby electronic devices;
wherein the processing device is further configured to monitor one or more responses to a notification by the user, and automatically adjust the assessment of the context and the determination of the notification framework based on the one or more monitored responses;
wherein the information retrieved from the one or more software programs comprises current schedule information retrieved from a calendar program, the current schedule information being associated with the user;
wherein the information retrieved from the calendar program further includes current schedule information that is associated with one or more other people associated with the user whose contact information is stored in the electronic device, and that is received from the one or more other people;
wherein the processing device is further configured to delay notification of the specific event to the user based on the assessed context, wherein the assessed context comprises determining whether the electronic device is located in an elevator.

2. The electronic device of claim 1, wherein the one or more physical sensors are selected from the group consisting of microphones, cameras, accelerometers, surface contact sensors, thermometers, and global positioning system ("GPS") devices.

3. The electronic device of claim 1, wherein the electronic device is a cellular telephone.

4. The electronic device of claim 3, further comprising a transceiver configured to communicate with another cellular device via a cellular network.

5. The electronic device of claim 4, wherein the processing device is further configured to determine the strength or bandwidth of cellular signals, and wherein the processing device is further configured to assess the context of the electronic device using the strength or bandwidth of the cellular signals.

6. The electronic device of claim 1, wherein the specific event comprises one of an incoming telephone call, an incoming cellular phone call, an incoming text message, an incoming e-mail message, and a calendar reminder.

7. The electronic device of claim 1, wherein the processing device is further configured to automatically adjust the assessment of the context and the determination of the notification framework based on data that is input by a user using an input device.

8. A notification developing program stored in memory and executed by a processing device, the notification developing program comprising:
logic adapted to receive physically sensed parameters;
logic adapted to receive virtually sensed parameters;
logic adapted to assess a context of an electronic device by processing the physically sensed parameters and the virtually sensed parameters;
logic adapted to determine a notification framework from the assessed context, the notification framework defining how notification information is presented to the user of the electronic device;
logic adapted to detect when a notification event associated with the electronic device occurs;
logic adapted to receive parameters associated with wireless communication activities of the electronic device with other electronic devices, wherein the logic adapted to assess the context of the electronic device further processes the parameters associated with the wireless communication activities to assess the context;

wherein the parameters associated with wireless communication activity comprises shared notification settings from the other electronic devices, and wherein the logic adapted to assess the context determines a predominate notification setting of the shared notification settings for assessing the context; and logic adapted to monitor one or more responses to a notification by the user, and automatically adjust the assessment of the context and the determination of the notification framework based on the one or more monitored responses;

wherein the virtually sensed parameters comprise current schedule information retrieved from a calendar program, the current schedule information being associated with the user;

wherein the information retrieved from the calendar program further includes current schedule information that is associated with one or more other people associated with the user whose contact information is stored in the electronic device, and that is received from the one or more other people;

wherein the logic adapted to determine a notification framework is further adapted to delay notification of the detected event to the user based on the assessed context, wherein the assessed context comprises determining whether the electronic device is located in an elevator.

9. The notification developing program of claim 8, wherein the notification developing program is stored on a computer-readable medium.

10. The notification developing program of claim 8, wherein, when a notification event is detected, the logic adapted to determine the notification framework is further adapted to notify the user within the notification framework of the notification event.

11. The notification developing program of claim 8, wherein the logic adapted to receive physically sensed parameters receives sound, images, force information, physiological information of the user, temperature readings, and location information.

12. The notification developing program of claim 8, wherein the delay is based on a parameter selected from the group consisting of the detection of pauses in a conversation, and the detection of a location of the electronic device in an elevator.

13. A method comprising:
receiving input from physical sensors located in proximity to an electronic device;
receiving input from one or more software programs;
receiving input from one or more other electronic devices in proximity to the electronic device;
assessing a context of the electronic device from the received input;
determining a notification framework from the assessed context;
notifying a user of the electronic device of a detected event associated with the electronic device;
wherein notifying the user includes notifying the user within said notification framework;
wherein the input from the one or more other electronic devices includes information regarding notification framework settings of the other electronic devices; and
monitoring one or more responses to a notification by the user, and automatically adjusting the assessment of the context and the determination of the notification framework based on the one or more monitored responses;
wherein the input from the one or more software programs comprises current schedule information retrieved from a calendar program, the current schedule information being associated with the user;
wherein the information retrieved from the calendar program further includes current schedule information that is associated with one or more other people associated with the user whose contact information is stored in the electronic device, and that is received from the one or more other people; and
delaying notification of the detected event to the user based on the assessed context, wherein the assessed context comprises determining whether the electronic device is located in an elevator.

14. The method of claim 13, further comprising:
receiving input from virtual sensors within the electronic device.

15. The method of claim 14, wherein the input received from the virtual sensors includes schedule information of the user.

16. The method of claim 13, wherein the physical sensors are integrated with the electronic device.

17. The method of claim 13, wherein the detected event includes one of an incoming telephone call, an incoming cellular phone call, an incoming text message, an incoming e-mail message, and an incoming calendar reminder.

* * * * *